United States Patent
Parekh et al.

(10) Patent No.: US 7,058,821 B1
(45) Date of Patent: Jun. 6, 2006

(54) SYSTEM AND METHOD FOR DETECTION OF INTRUSION ATTACKS ON PACKETS TRANSMITTED ON A NETWORK

(75) Inventors: Pankaj S. Parekh, San Jose, CA (US); Sandeep Gupta, Delhi (IN); Vijay P. Mamtani, New Delhi (IN); Sarraju N. Rao, New Delhi (IN); Yashodhan R. Deshpande, Sunnyvale, CA (US)

(73) Assignee: iPolicy Networks, Inc., Fremont, CA (US)

( * ) Notice: Subject to any disclaimer, the term of this patent is extended or adjusted under 35 U.S.C. 154(b) by 895 days.

(21) Appl. No.: 10/052,328

(22) Filed: Jan. 17, 2002

Related U.S. Application Data

(60) Provisional application No. 60/262,435, filed on Jan. 17, 2001.

(51) Int. Cl.
*G06F 11/30* (2006.01)

(52) U.S. Cl. .................. 713/194; 713/200; 713/201

(58) Field of Classification Search ............... 713/194, 713/200, 201
See application file for complete search history.

(56) References Cited

U.S. PATENT DOCUMENTS

| 6,075,798 A | 6/2000 | Lyons et al. ............... 370/474 |
| 6,587,466 B1 | 7/2003 | Bhattacharya et al. . 370/395.21 |

*Primary Examiner*—Thomas R. Peeso
(74) *Attorney, Agent, or Firm*—Thelen Reid & Priest LLP

(57) ABSTRACT

An intrusion detection system detects and takes appropriate action against intrusion attacks on packets transmitted on a network. Various conditions for the intrusion attacks are described in the form of a rule tree. The intrusion detection system employs a pipelined structure including a plurality of modules, and parts of the rule are assigned to the modules. The modules determine in a pipelined manner whether the conditions of an intrusion attack are satisfied. In an intrusion attack on the packet is detected, the intrusion detection system takes appropriate action against the determined intrusion attack.

26 Claims, 4 Drawing Sheets

200

SYSTEM AND METHOD FOR DETECTION OF INTRUSION ATTACKS ON PACKETS TRANSMITTED ON A NETWORK

CROSS-REFERENCE TO RELATED APPLICATIONS

This application claims priority under 35 U.S.C. §119(e) to co-pending U.S. Provisional Patent Application No. 60/262,435, entitled "Intrusion Detection Policy Engine," filed on Jan. 17, 2001, the subject matter of which is incorporated by reference in its entirety herein.

This application is also related to co-pending U.S. patent application Ser. No. 10/052,745, entitled "Architecture for an Integrated Policy Enforcement System," filed on Jan. 17, 2002, and to co-pending U.S. patent application Ser. No. 09/956,394, entitled "Universal Application Decode Engine," filed on Sep. 18, 2001, the subject matters of which are incorporated by reference in their entirety herein.

TECHNICAL FIELD

The present invention relates generally to an intrusion detection system, and in particular to an intrusion detection policy engine that enforces intrusion detection policies on a stream of IP packets on the Internet passing through the intrusion detection system.

BACKGROUND OF THE INVENTION

Recently, the amount of Internet traffic has increased enormously. People have become increasingly dependent upon the Internet. At the same time, hacking activities on the Internet have also increased. As people are more dependent upon the Internet, they become more vulnerable to attacks on the servers and client computers.

The increasing threat of intrusion attacks on the servers or the Internet network has created a strong need for mechanisms through which Internet Service Providers (ISPs) can offer safer Internet access to customers without interruption to the operation of the network and the servers due to such intrusion attacks. The ISPs need a complete intrusion protection solution that can detect, prevent, and react to unauthorized activity throughout the network. However, current network architectures lack efficient tools that enable ISPs to provide intrusion attack protection to their customers at wire speed without interrupting their service and adding a significant processing burden on the host servers. Without such efficient mechanisms for intrusion attack protection, ISPs cannot obtain customer confidence in their ability to provide a secure network infrastructure.

In the past, various types of intrusion detection systems have been developed for IP networks such as the Internet. So far, primarily two types of intrusion detection devices have been developed, i.e., host-based intrusion detection systems and network-based intrusion detection systems.

Host-based intrusion detection systems typically run on the host system that they are protecting. Agent software is installed on the host server that is to be monitored. The agent software tracks unauthorized access attempts or other unauthorized activities on the host server. They typically require a certain amount of additional network packet processing by the host servers, thus slowing down the services that the host servers provide.

Network-based intrusion detection systems typically run on the network itself. Typically, agents are installed on LAN (Local Area Network) segments or behind firewalls to monitor and analyze network traffic. These network-based intrusion detection systems typically provide intrusion detection while running in promiscuous mode on the network. They observe the network traffic and compare it against previously identified intrusion attack signatures. Typically, network-based intrusion detections systems cannot operate at the wire speed of the network, so they are incapable of running in in-line mode and taking appropriate action against the attacks in real time. Examples of such network-based intrusion detection systems are RealSecure™ from Internet Security Systems, Inc., and NetProwler™ from Symantec Corporation.

Therefore, it is necessary for the ISPs to have an intrusion detection system that runs in in-line mode and enables the ISPs to provide intrusion detection and protect their customers from intrusion at wire speed without adding a large processing burden on the host servers. In addition, the intrusion detection system should be easy to customize, so that ISPs can offer intrusion detection services on a selective basis, thus providing flexibility and creating a separate revenue source for the ISPs.

SUMMARY OF INVENTION

The present invention solves the problems of the prior art by providing a novel Intrusion Detection System ("IDS") Policy Engine that is network-based but runs in in-line mode instead of promiscuous mode, such that every packet on the network is inspected as it passes through the IDS Policy Engine. The IDS policy engine is able to decode streams of IP packets flowing through it up to the application layer of the Open System Interconnection (OSI) 7-Layer Reference Model, identify transactions of the application and any associated parameters of the transaction in real time (at high speeds of the order of Gigabits/sec), and then impact the streams of IP packets in such a way that the IP packets become free of any intrusion attacks as defined by intrusion detection policy rules.

According to one embodiment of the present invention, the IDS Policy Engine is one of the modules of a Policy Agent (PA) that monitors packets (IP packets) transmitted on a network such as the Internet. A PA comprises a plurality of modules including a Generic Extension Builder, a Session Cache Module, an Application Decode Module, a Rule Engine Module and multiple Policy Enforcement Engines ("PE"), one of which is the IDS PE. The packets passing through the PA are analyzed by the various modules and their gathered intelligence is passed along by use of packet extensions that are attached to them for their passage through the PA. The modules of the PA operate at real time processing rates in order to be capable of operating in a real network environment.

The PA may be further supported by a Policy Manager that is responsible for configuring the policies/rules to be enforced by the PA and hence its policy engines. The Policy Manager downloads the policy rules to the PA and each individual Policy Engine is responsible for enforcing their respective policies. For example, the IDS PE is responsible for enforcing the intrusion detection policy rules. The common processing of IP packets which is required for multiple Policy Engines is performed by common sub modules, which include the generic extension Builder, session cache module, application decode module, and the rule engine module and results of their analyses are passed to the IDS PE in the form of packet extensions which are attached to the packets flowing through the PA.

According to an embodiment of the present invention, all rules for the known intrusion attacks are converted to a rule tree having condition nodes that can be traversed during the processing of packets in the PA in order to identify the intrusion attacks. Various parts of the rule tree correspond to the various modules in the PA, and each module in the PA is responsible for processing the corresponding part of the rule tree. Because the PA has a pipelined architecture responsible for processing only the assigned part of the rule tree, the various rules for the intrusion attacks can be processed in a distributed manner such that the PA can utilize necessary processing power for wire speed performance.

According to another embodiment of the present invention, the IDS PE performs the enforcement of intrusion detection policies. The IDS PE receives IP packets with the appended extensions having information gathered by the common modules. The IDS PE may also receive selected ones of the intrusion detection policy rules to be enforced. The IDS PE matches the policy rules to be applied for the IP packet and performs the actions in the matched policy rules.

According to another embodiment of the present invention, users of the IDS PE can choose IDS rules that they wish to enforce. Thus, the intrusion detection system of the present invention is easy to customize, and the ISPs using the IDS PE of the present invention can offer intrusion detection services on a selective basis, thus providing flexibility and creating a separate revenue source for the ISPs.

According to still another embodiment of the present invention, a method detects a plurality of intrusion attacks to a packet transmitted on a network by using a multi-stage intrusion detection system. The intrusion attacks are associated with a plurality of conditions. The method receives the packet, and determines at a first stage of the intrusion detection system whether a first condition assigned to the first stage is satisfied for the packet. Then, the method determines at a second stage of the intrusion detection system whether a second condition assigned to the second stage is satisfied for the packet. Next, the method determines that the packet corresponds to an intrusion attack when it is determined that the first condition and the second condition are satisfied.

According to still another embodiment of the present invention, a multi-stage intrusion detection system detects a plurality of intrusion attacks to a packet transmitted on a network. The intrusion attacks are associated with a plurality of conditions. The multi-stage intrusion detection system comprises a first stage receiving the packet and determining whether a first condition assigned to the first stage is satisfied for the packet, and a second stage determining whether a second condition assigned to the second stage is satisfied for the packet. The multi-stage intrusion detection system determines that the packet corresponds to an intrusion attack when it is determined that the first condition and the second condition are satisfied.

According to still another embodiment of the present invention, a multi-stage intrusion detection system detects a plurality of intrusion attacks to a packet transmitted on a network, wherein each intrusion attack is associated with a plurality of conditions. The multi-stage intrusion detection system comprises a plurality of modules each corresponding to selected ones of the conditions and each determining whether the corresponding conditions are satisfied. The multi-state intrusion detection system may also comprise a policy manager controlling selected ones of the modules and providing information used in determining whether the corresponding conditions are satisfied to the selected ones of the modules. An intrusion attack is detected when all the conditions corresponding to the intrusion attack are determined to be satisfied by the respective modules.

According to still another embodiment of the present invention, the conditions belong to one of a first, second, third, fourth, and fifth set of conditions, and the plurality of modules comprise a generic extension builder, a session cache module, an application decode module, a rule engine module, and an intrusion detection policy engine. The generic extension builder (i) receives the packet, (ii) processes the first set of conditions on the packet to generate generic extensions, and (iii) outputs the packet along with the generic extensions added to the packet. The session cache module is coupled to the generic extension builder and (i) receives the packet with the generic extensions, (ii) processes the second set of conditions on the packet to generate session cache extensions, and (iii) outputs the packet along with the generic extensions and the session cache extensions added to the packet. The application decode module is coupled to the session cache module and (i) receives the packet with the generic extensions and the session cache extensions, (ii) processes the third set of conditions on the packet to generate application decode extensions, and (iii) outputs the packet along with the generic extensions, the session cache extensions, and the application decode extensions added to the packet. The rule engine module is coupled to the application decode module and (i) receives the packet with the generic extensions, the session cache extensions, and the application decode extensions, (ii) processes the fourth set of conditions on the packet to generate rule engine extensions, and (iii) outputs the packet along with the generic extensions, the session cache extensions, the application decode extensions, and the rule engine extensions added to the packet. Finally, the intrusion detection policy engine is coupled to the rule engine module and (i) receives the packet with the generic extensions, the session cache extensions, the application decode extensions, and the rule engine extensions, (ii) processes the fifth set of conditions on the packet, (iii) determines whether all the conditions of an intrusion attack are satisfied based upon the generic extensions, the session cache extensions, the application decode extensions, the rule engine extensions, and the processed fifth set of conditions, (iv) takes an action corresponding to the determined intrusion attack, and (v) outputs the packet.

According to still another embodiment of the present invention, a computer-readable medium stores a rule tree for use in an intrusion detection system for detecting a plurality of intrusion attacks to a packet transmitted on a network. Each intrusion attack is associated with a rule having a plurality of conditions and an action to be taken when the intrusion attack is detected. The rule tree comprises a plurality of condition node pairs each having an expression node and a value node, and each condition node pair corresponds to one condition and is coupled to another condition node pair via a branch to form a plurality of paths. Traversing along one of the paths corresponds to determining all the conditions of the rule for one of the intrusion attacks. Because common conditions in the intrusion attack are grouped and correspond to one condition node pair, the conditions in all the intrusion attacks can be determined by traversing a minimum number of condition node pairs.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
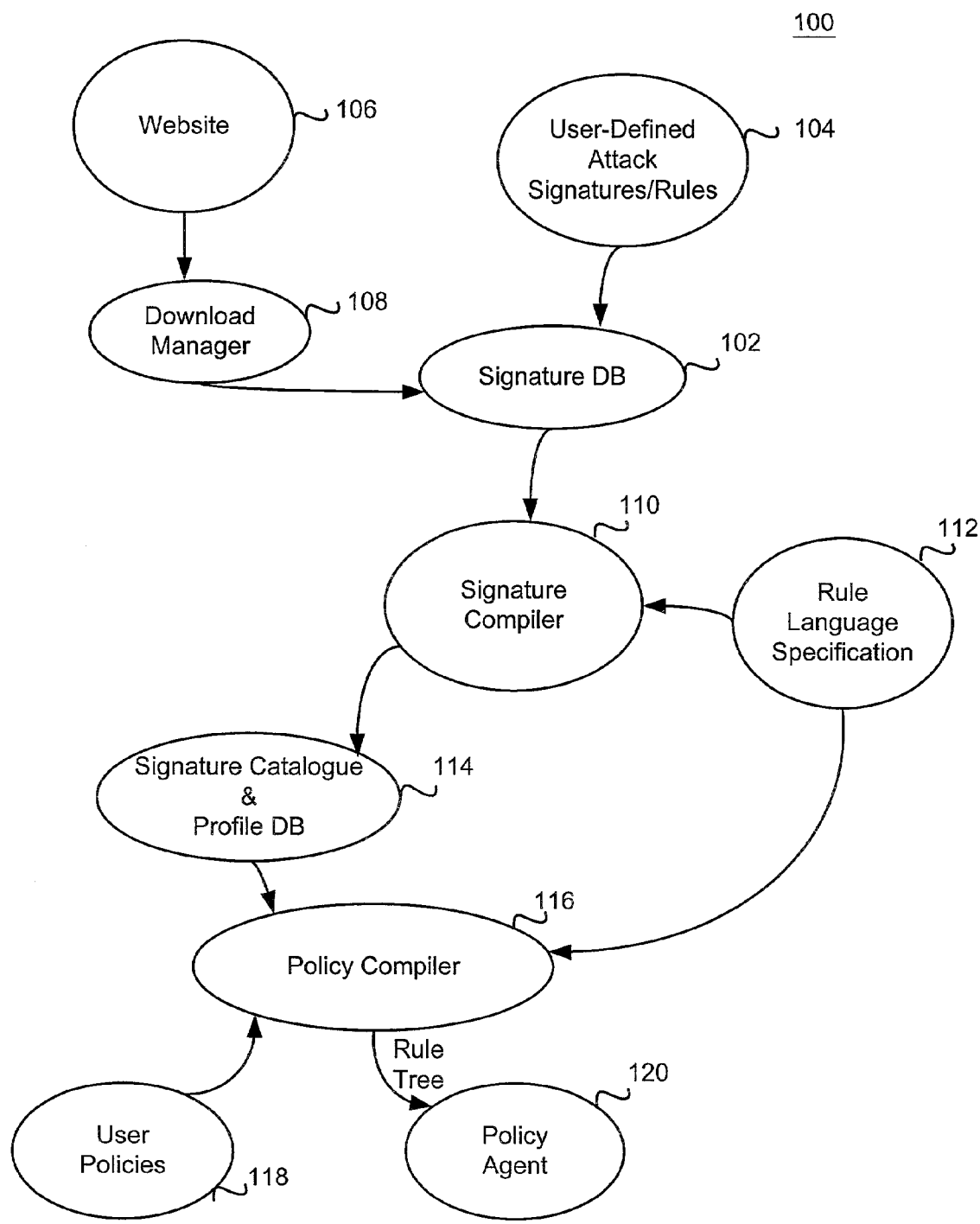
FIG. 1 is a diagram illustrating the overall operation of the Intrusion Detection System 100 according to one embodiment of the present invention.

FIG. 1 is a diagram illustrating the overall operation of the Intrusion Detection System (IDS) 100 according to one embodiment of the present invention. The terms "rule" and "signature" are used interchangeably herein. Referring to FIG. 1, a signature database (DB) 102 stores all the signatures (descriptions) of the intrusion attacks that can be detected by the IDS 100. The description below provides examples of signatures for a few well-known intrusion attacks that are stored in the signature DB 102. The signatures are described using a rule language 112. It should be noted that the rule language description used herein for the sample intrusion attacks is merely exemplary and can be different depending upon implementation, and any type of rule language describing the various intrusion attacks will be sufficient for the purposes of the present invention, as long as it can describe the various conditions associated with the intrusion attacks.

The sample intrusion attacks that are discussed herein are ICMP Smurf Attack, UDP Smurf Attack, Land Attack, Flood of Ping Reply Attack, and Tear Drop Attack. The description herein is based upon the assumption that the network on which the IP packets are transmitted is based on the OSI 7-Layer Reference Model, as is the case according to one embodiment of the present invention. The rules have expressions that include a set of conditions. The following are several examples of intrusion attacks and rules needed to detect them.

ICMP Smurf Attack occurs when an ICMP packet with ICMP Code 8 is sent to an IP broadcast address. The basic purpose of this attack is to flood the entire network with ICMP messages. The ICMP Smurf Attack can be described in the rule language as follows:

```
/* Rule R1 -ICMP Smurf Attack */
RULE Icmp_Smurf
{
IF (PKT_DIR:INBOUND & L3:IP & IN_IP:IP_BROADCAST & L4:
ICMP & ICMP_CODE:ICMP_CODE_8);
    ACTION IDS /* Indicates that IDS PE needs to execute following
    action */
    {
        {PACKET} ACTION_ALARM
    }
}
```

Rule R1 means that the IDS should send an alarm (ACTION_ALARM) when the conditions in the IF clause are satisfied. The conditions are: (i) packet direction is inbound (PKT_DIR: INBOUND); (ii) Layer 3 protocol is IP (L3:IP); (iii) inbound IP is IP_Broadcast (IN_IP: IP_BROADCAST); (iv) Layer 4 protocol is ICMP (L4: ICMP); and (v) ICMP code is ICMP Code 8 (ICMP_CODE: ICMP_CODE_8). "{PACKET}" means that the ICMP Smurf Attack is a packet-based attack.

A UDP Smurf Attack is very similar to an ICMP Smurf Attack except that the layer 4 protocol is UDP and it is sent to an echo port as the destination port, causing flood of echo messages on the network. The UDP Smurf Attack can be described in the rule language as follows:

```
/* Rule R2 -UDP Smurf Attack */
RULE UDP_Smurf
{
IF (PKT_DIR:INBOUND & L3:IP & IN_IP:IP_BROADCAST &
L4:UDP & DST_PORT:ECHO);
    ACTION IDS
    {
        {PACKET} ACTION_ALARM
    }
}
```

Rule R2 means that the IDS should send an alarm (ACTION_ALARM) when the conditions in the IF clause are satisfied. The conditions are: (i) packet direction is inbound (PKT_DIR: INBOUND); (ii) Layer 3 protocol is IP (L3:IP); (iii) inbound IP is IP_Broadcast (IN_IP:IP_BROADCAST); (iv) Layer 4 protocol is UDP (L4:UDP); and (v) the destination port is the echo port (DST_PORT: ECHO). "{PACKET}" means that the UDP Smurf Attack is a packet-based attack.

A Land Attack occurs when the TCP or UDP packet has the same source and destination IP addresses, such that once the packet reaches the destination, it confuses some of the implementation of the TCP/UDP-IP stack, causing it to fail. If this happens, the machine at the destination becomes unreachable via the network. The Land Attack can be described in the rule language as follows (Rule R3_1 is for a TCP packet and Rule R3_2 is for a UDP packet):

```
/* Rule R3-1 Land Attack, TCP */
RULE Land_1
{
IF (PKT_DIR:INBOUND & L3:IP & L4:TCP & TCP_FLAGS:SYN &
INIP_EQ_OUTIP:TRUE & INPORT_EQ_OUTPORT:TRUE);
    ACTION IDS
    {
    {PACKET} ACTION_ALARM
    }
}
```

```
/* Rule R3-2 - Land Attack, UDP */
RULE Land_2
{
IF (PKT_DIR:INBOUND & L3:IP & L4:UDP & INIP_EQ_OUTIP:
TRUE & INPORT_EQ_OUTPORT:TRUE);
    ACTION IDS
    {
    {PACKET} ACTION_ALARM
    }
}
```

Rule Land_1 means that the IDS should send an alarm (ACTION_µM when the conditions in the IF clause are satisfied. The conditions are: (i) packet direction is inbound (PKT_DIR: INBOUND); (ii) Layer 3 protocol is IP (L3:IP); (iii) Layer 4 protocol is TCP (L4:TCP); (iv) packet is the first packet of a new TCP session (TCP_FLAGS:SYN); (v) input IP of packet equals output IP of packet (INIP_EQ_OUTIP: TRUE); and (vi) input port equals output port (INPORT_EQ_OUTPORT:TRUE). "{PACKET}" means that the TCP packet Land Attack is a packet-based attack.

Rule Land_2 means that the IDS should send an alarm (ACTION_ALARM) when the conditions in the IF clause are satisfied. The conditions are: (i) packet direction is inbound (PKT_DIR: INBOUND); (ii) Layer 3 protocol is IP (L3:IP); (iii) Layer 4 protocol is UDP (L4:UDP); (iv) input IP of packet equals output IP of packet (INIP_EQ_OUTIP: TRUE); and (v) input port equals output port (INPORT_EQ_OUTPORT:TRUE). "{PACKET}" means that the UDP packet Land Attack is a packet-based attack.

A Ping Reply Flood Attack occurs when one ICMP packet with ICMP code 0 is sent to a destination. It does not cause any harm but if this action is repeated many times over a very short period of time, then it causes that machine at the destination to become unreachable via the network. The Ping Reply Flood Attack can be described in the rule language as follows:

```
/* Rule R4 -Ping Reply Flood Attack */
RULE PING_Reply_Flood
{
IF (PKT_DIR:INBOUND & L3:IP & L4:ICMP & ICMP_CODE:0);
    {
    {COUNTER, PING_Reply_Flood, 20, 60} ACTION_ALARM
    }
}
```

Rule R4 means that the IDS should send an alarm (ACTION_ALARM) when the conditions in the IF clause are satisfied. The conditions are: (i) packet direction is inbound (PKT_DIR: INBOUND); (ii) Layer 3 protocol is IP (L3:IP); and (iii) ICMP code is ICMP Code 0 (ICMP_CODE:ICMP_CODE_0). "{COUNTER, PING_Reply_Flood, 20, 60}" means that PING_Reply_Flood is a counter_type attack such that the IDS should count how many times ICMP code 0 is sent to the destination in a period of 60 seconds, and that if it exceeds 20 times the action (alarm) should be taken.

A Tear Drop Attack is a well-known attack that exploits the weakness of the TCP/IP protocol stack. Once the IP packet becomes fragmented, it carries information about the fragmented packet but does not carry information about the complete un-fragmented packet. Thus, two overlapping fragments causes memory corruption in some of the TCP/IP stack implementations, and the attacker exploits this weakness by sending two packets that contain the IP fragmentation with overlapping fragments. The Tear Drop Attack can be described in the rule language as follows:

```
/* Rule R5-1 Tear Drop Attack, 1st Packet */
RULE TearDrop1
{
IF (L3:IP & L4:UDP & IP_FLAGS:IP_FLAGS_FIRST_FRAGMENT);
    ACTION IDS;
    {
    {SEQUENCE, TEAR_DROP, 1, TEAR_DROP_CODE_1.seq}
    }
}
```

```
/* Rule R5-2 - Tear Drop Attack, Next Packet*/
RULE TearDrop2
{
IF (L3:IP & L4:UDP & IP_FLAGS:IP_FLAGS_IS_FRAGMENT);
    ACTION IDS;
    {
    {SEQUENCE, TEAR_DROP, 2, TEAR_DROP_CODE_2.seq}
    }
}
```

Rule R5-1 (TearDrop 1) means that the IDS should follow the action in the state machine TEAR_DROP_CODE_1 seq when the conditions in the IF clause are satisfied. The conditions are: (i) Layer 3 protocol is IP (L3:IP); (ii) Layer 4 protocol is UDP (L4:UDP); and (iii) the packet is first fragment of an IP packet (IP_FLAGS_FIRST_FRAGMENT). The state machine TEAR_DROP_CODE_1.seq is a state machine that saves the IP packet ID and the packet length of the IP packet. "{SEQUENCE, TEAR_DROP, 1, TEAR_DROP_CODE_1.seq}" means that the Tear Drop Attack (Type 1) is a sequence-type attack and the state machine TEAR_DROP_CODE_1.seq should be operated when the conditions are satisfied.

Rule R5-2 (TearDrop 2) means that the IDS should follow the action in the state machine TEAR_DROP_CODE_2.seq when the conditions in the IF clause are satisfied. The conditions are: (i) Layer 3 protocol is IP (L3:IP); (ii) Layer 4 protocol is UDP (L4:UDP); and (iii) the packet is a fragmented packet (IP_FLAGS_IS_FRAGMENT). The state machine TEAR_DROP_CODE_2.seq is a state machine that checks overlapping fragments using the saved IP packet ID and packet length in the TEAR_DROP_CODE_1.seq state machine. It is designed such that at the end of the state machine it can be determined whether or not the sequence of fragments of IP packets are causing the Tear Drop Attack. "{SEQUENCE, TEAR_DROP, 2, TEAR_DROP_CODE_2.seq}" means that the Tear Drop Attack (Type 2) is a sequence-type attack and the state machine TEAR_DROP_CODE_2.seq should be operated when the conditions are satisfied.

Referring again to FIG. 1, the signatures of the intrusion attacks stored in the signature DB 102 are obtained from the users of the IDS 100. The users can input user-defined attack signatures/rules 104 to the signature DB 102. The intrusion attack signatures can also be downloaded from a remote website 106 to the signature DB 102. In this case, a download 108 controls the download and integration of the intrusion attack signatures to the signature DB 102.

The signature compiler 110 analyzes the intrusion attack signatures stored in the signature DB 110 and creates a rule expression table (also referred to herein as "condition table") and a rule action table, using the rule language specification 112 by which the signatures are described. The rule expression table and the rule action table are stored in the signature catalogue and profile database 114. The rule expression table is a table describing all the conditions (expressions) for each attack signature (rule). The rule action table is a table describing the actions to take when all the conditions for an attack are satisfied.

For example, a sample expression table for the above rules Rule 1, Rule 2, Rule 3-1, Rule 3-2, Rule 4, Rule 5-1, and Rule 5-2 is as follows:

[Expression Table]

| Rule Type | Expressions |
| --- | --- |
| Rule R1 (ICMP Smurf Attack) | E1, E2, E6 |
| Rule R2 (UDP Smurf Attack) | E1, E4, E8, E12 |
| Rule R3-1 (Land Attack 1) | E1, E3, E7, E11, E13 |
| Rule R3-2 (Land Attack 2) | E1, E4, E11, E13 |
| Rule R4 (Ping Reply Flood Attack) | E1, E2, E5 |
| Rule R5-1 (Tear Drop Attack 1) | E1, E4, E9 |
| Rule R5-2 (Tear Drop Attack 2) | E1, E4, E10 |

In the above expression table, the expressions E1–E13 refers to the following conditions as described in the signature rules:
E1=L3:IP
E2=L4:ICMP
E3=L4:TCP
E4=L4:UDP
E5=ICMP_CODE:ICMP_CODE 0
E6=ICMP_CODE:ICMP_CODE_8
E7=TCP_FLAGS:SYN
E8=IN_IP:IP_BROADCAST
E9=IP_FLAGS:IP_FLAGS_FIRST_FRAGMENT
E10=IP_FLAGS:IP_FLAGS_IS_FRAGMENT
E11=INIP_EQOUTIP:TRUE
E12=DST_PORT:ECHO
E13=INPORT_EQOUTPORT:TRUE A sample rule action table for the above rules Rule 1, Rule 2, Rule 3-1, Rule 3-2, Rule 4, Rule 5-1, and Rule 5-2 is as follows:

[Action Table]

| Rule Type | Action | Description |
| --- | --- | --- |
| Rule R1 (ICMP Smurf Attack) | Alarm | If R1 matches, send an alarm. |
| Rule R2 (UDP Smurf Attack) | Alarm | If R2 matches, send an alarm. |
| Rule R3-1 (Land Attack 1) | Alarm | If R3-1 matches, send an alarm. |
| Rule R3-2 (Land Attack 2) | Alarm | If R3-2 matches, send an alarm. |
| Rule R4 (Ping Reply Flood Attack) | Count_For_Dest_$_{IP++;}$ If Count_$_{For-}$Dest_IP >=20 in less than last 60 seconds, then Alarm. | The IDS PE must keep track of the number of times that Rule R4 is matched for each destination IP along with the time elapsed in order to identify this attack. |
| Rule R5-1 (Tear Drop Attack 1) | Save IP packet ID and save Packet_Length | No attack is detected here. However, IDS PE must save this information. |
| Rule R5-2 (Tear Drop Attack 2) | Check overlapping fragments using saved IP packet ID and saved Packet_Length. If overlap is found, then Alarm. | Existence of overlapping fragments in the next packet means that the Tear Drop Attack has occurred. |

The rule expression and rule action tables and the content therein are mere conceptual examples and, and can be stored in the signature catalogue and profile DB 114 in any form.

Figure 2:
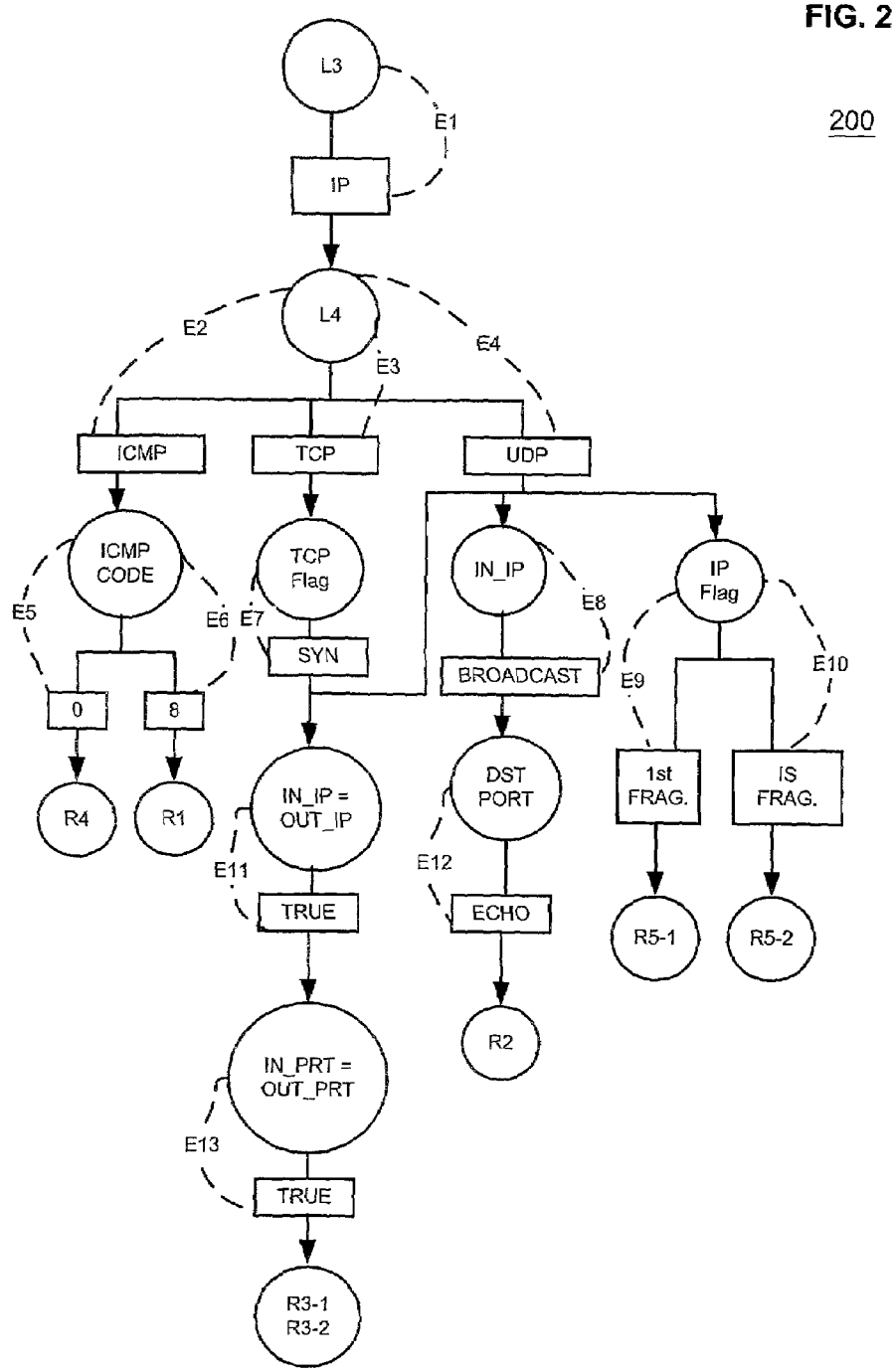
FIG. 2 is a diagram illustrating an IDS Rule Tree 200 according to one embodiment of the present invention.

The policy compiler 116 uses the rule expression table stored in the signature catalogue and profiled DB 114 to create a rule tree. A sample rule tree for the above rules Rule 1, Rule 2, Rule 3-1, Rule 3-2, Rule 4, Rule 5-2 is shown in FIG. 2. The rule tree 200 in FIG. 2 will be explained in detail below. In converting the rule expression table to a rule tree 200, the policy compiler 116 examines the rule expression table and extracts common expressions (conditions) among the various rules. For example, E1 is a common expression among the rules in the example above. Each expression will correspond to a condition node in the rule tree, and common expressions will correspond to only one condition node. Two different condition nodes are coupled via a branch if both of the expressions corresponding to the condition nodes are part of a single rule. For example, E1 is connected to E4, because both E1 and E4 are conditions contained in Rule R2, R3-2, R5-1, or R5-2. In this manner, following the expression nodes of the rule tree along one of the paths created by the branches will result in covering all the conditions of one of the rules. Because common conditions in the intrusion attacks are grouped and correspond to only one condition node, the conditions in all the intrusion attacks can be determined by traversing a minimum number of condition nodes.

According to one embodiment of the present invention, a user may select only a part of the various attack signatures stored in the signature catalogue and profile DB 114 by providing a list of user policies 118 to the policy compiler 116. The policy compiler 116 utilizes the user policies 118 and creates a rule tree comprising conditions contained in only the selected user policies 118. Due to this user selection capability, the intrusion detection system of the present invention is easy to customize, and the ISPs can offer intrusion detection services on a selective basis, thus providing flexibility and creating a separate revenue source for the ISPs.

The policy agent 120 receives the rule tree created by the policy compiler 116 and the rule action table and actually performs the intrusion detection using the rule tree. The policy agent 120 will be explained in detail below with reference to FIG. 3.

FIG. 2 is a diagram illustrating a rule tree 200 according to one embodiment of the present invention. The rule tree 200 can be stored in any type of computer-readable medium. The rule tree 200 in FIG. 2 is a sample rule tree for the sample rules Rule R1, Rule R2, Rule R3-1, Rule R3-2, Rule R4, Rule R5-1, and Rule R5-2.

As shown in FIG. 2, the expressions E1–E13 in the rule expression table are shown as condition nodes in the rule tree 200, i.e., each expression in the expression table corresponds to a condition node in the rule tree 200. The condition nodes have an expression node and a value node. For example, the condition node for E1 has an expression node "L3" (shown as a circle) and a value node "IP" (shown as a rectangle). If there are common expressions in the expression table, those common expressions will be consolidated such that they correspond to only one condition node in the rule tree 200. For example, E1 is an expression common to all rules Rule R1, Rule R2, Rule R3-1, Rule R3-2, Rule R4, Rule R5-1, and Rule R5-2. However, there is only one condition node for E1.

Two different condition nodes are coupled to each other via a branch if they are part of a single rule. For example, the condition nodes for expressions E1 and E2 are coupled via a branch because both E1 and E2 are part of either rule R1 or R4. The condition nodes and the braches in the rule tree 200 form several paths. Following the expression nodes of the rule tree along one of the paths results in covering all the conditions of one of the rules. For example, following the path formed by condition nodes E1, E2, and E5 and the branches therebetween results in going over all the conditions in Rule R4. Because the rule tree 200 has only one node for one common expression and comprises multiple levels of hierarchy, the conditions in all the intrusion attacks can be determined by traversing a minimum number of condition nodes. Thus, the rule tree 200 provides an efficient way of reducing redundancies in the multiple rules for intrusion detection and of providing a pipelined structure for the IDS.

Figure 3:
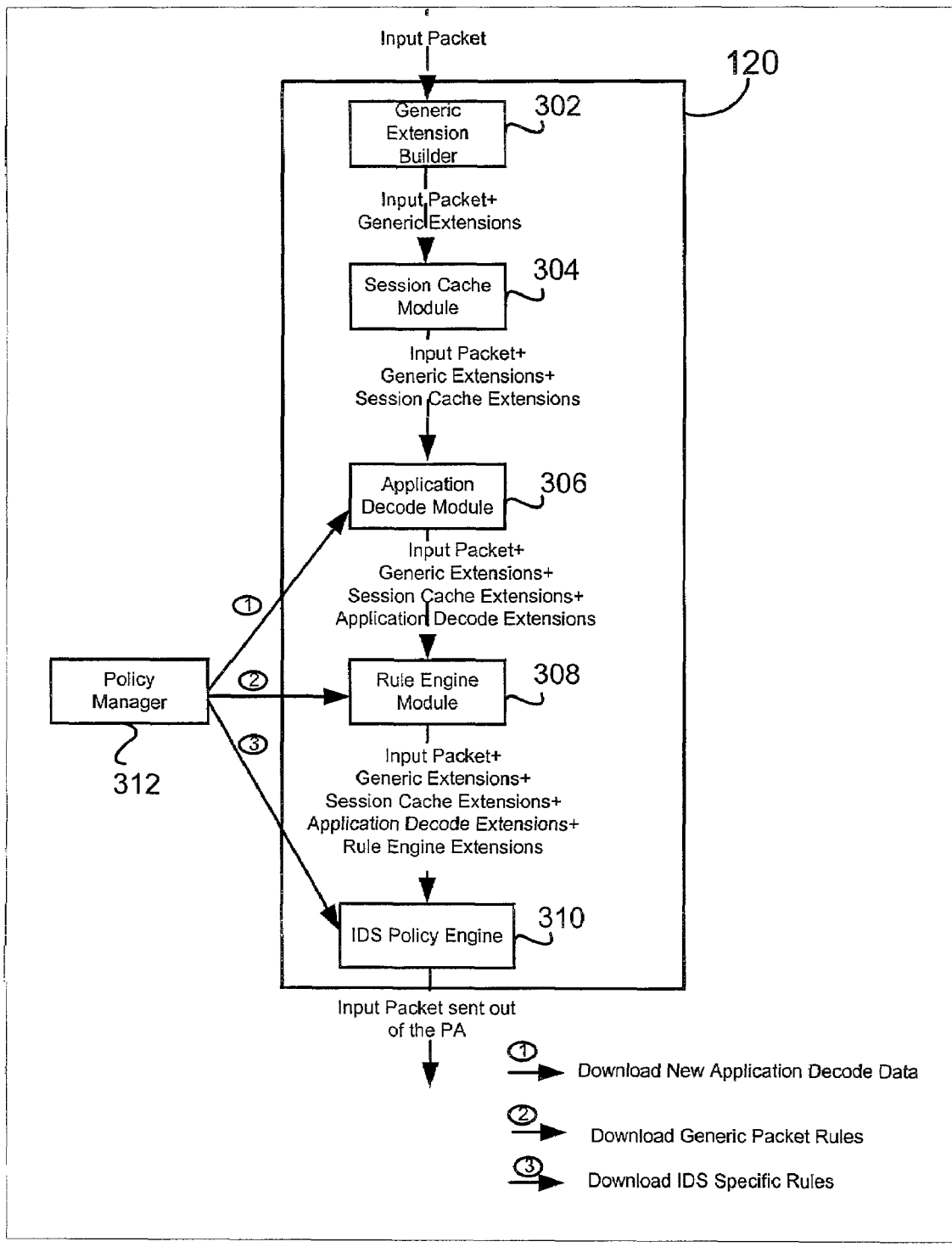
FIG. 3 is a block diagram illustrating the various modules in the Policy Agent 120 according to one embodiment of the present invention.

FIG. 3 is a block diagram illustrating the Policy Agent 120 according to one embodiment of the present invention. Referring to FIG. 3, the Policy Agent 120 comprises a generic extension builder 302, a session cache module 304, an application decode module 306, a rule engine module 308, and an intrusion detection policy engine 310. The Policy Agent 120 may also be supported by a policy manager 312.

The policy agent 120 receives the rule tree 200 from the policy compiler 116, breaks down the rule tree 200 to smaller rule trees, and assigns the smaller rule trees to the various modules in the policy agent 120, based on the Open System Interconnection (OSI) 7-Layer Reference Model. The smaller rule trees comprise conditions corresponding to one of the layers of the OSI 7-layer model and rule-specific conditions not corresponding to any layer of the OSI 7-layer model. For example, E1 corresponds to layer 3, but E13 is a rule-specific condition because it does not correspond to any layer of the OSI 7-layer model.

According to one embodiment of the present invention, the generic extension builder 302 is assigned the conditions in the rule tree 200 corresponding to layers two and three of the OSI 7-layer model, e.g., E1 in the rule tree 200. The generic extension builder 302 (i) receives the input packet, (ii) processes the conditions corresponding to layers two and three on the packet to generate generic extensions, and (iii) outputs the packet along with the generic extensions added to the packet.

The session cache module 304 is coupled to the generic extension builder 302 and is assigned the conditions in the rule tree 200 corresponding to layer four of the OSI 7-layer model, e.g., E2, E3, and E4 in the rule tree 200. The session cache module (i) receives the packet with the generic extension, (ii) processes the conditions corresponding to layer four on the packet to generate session cache extensions, and (iii) outputs the packet along with the generic extensions and the session cache extensions added to the packet. Processing layer 4 conditions may include identifying a stream of packets belonging to a session with a session ID, and identifying start/close of new sessions.

The application decode module 306 is coupled to the session cache module 304 and is designed to analyze the conditions in the rule tree 200 corresponding to layers five, six, and seven of the OSI 7-layer model. The application decode module 306 (i) receives the packet with the generic extensions and the session cache extension, (ii) processes layer conditions corresponding to layers five, six, and seven on the packet to generate application decode extensions, and (iii) outputs the packet along with the generic extensions, the session cache extensions, and the application decode extensions added to the packet.

The rule engine module 308 is coupled to the application decode module 306 and is assigned selected ones of the rule-specific conditions in the rule tree 200. The rule engine module 308 (i) receives the packet with the generic extensions, the session cache extensions, and the application decode extensions; (ii) processes selected ones of the rule-specific conditions on the packet to generate rule engine extensions, and (iii) outputs the packet along with the generic extensions, the session cache extensions, the application decode extensions, and the rule engine extensions.

The intrusion detection policy engine 310 is coupled to the rule engine module 308 and is assigned remaining ones of the rule-specific conditions in the rule tree 200. The intrusion detection policy engine 310 (i) receives the packet with the generic extensions, the session cache extensions, the application decode extensions, and the rule engine extensions; (ii) processes remaining ones of the rule-specific conditions on the packet, (iii) determines whether all the conditions of an intrusion attack are satisfied based upon the generic extensions, the session cache extensions, the application decode extensions, the rule engine extensions, and the processed remaining rule-specific conditions, (iv) takes an appropriate action corresponding to the determined intrusion attack using the rule action table, and (v) outputs the packet with all the extensions removed from the packet.

The policy manager 312 controls the application decode module 306, the rule engine module 308, and the intrusion detection policy engine 310. The application decode module 306 receives application decode data from the policy manager 312 for use in processing the layer conditions corresponding to layers five, six, and seven on the packet. The rule engine module 308 receives the selected ones of the rule-specific conditions (generic packet rule conditions) from the policy manager 312, and the intrusion detection policy engine 310 receives the remaining ones of the rule-specific conditions (IDS-specific rule conditions) from the policy manager 312. The policy manager 312 can determine how many and which rule-specific conditions should be assigned to the rule engine module 308 and to the intrusion detection policy engine 310 depending upon how the processing burden should be distributed between the rule engine module 308 and the intrusion detection policy engine 310. For example, the rule engine module 308 may process all the rule-specific conditions such that the intrusion detection policy engine 310 merely determines whether all the conditions associated with an intrusion attack is satisfied without processing any conditions on the packet.

Because the IDS policy agent 120 employs a pipelined structure utilizing the rule tree 200, it is not necessary to process every expression of the intrusion attack signatures on the packet while it is traversing through the various modules in the policy agent 120. The various modules in the policy agent 120 utilize the analyses results obtained by previous modules by using the extensions attached to the packet by the previous modules. Thus, the processing required for every intrusion attack processing is significantly reduced. In addition, since some of the expressions (conditions) are mutually exclusive, the policy agent does not have to process every expression for the attack signatures and the overall processing requirement is significantly reduced. Additionally, the rule tree may be shared with other policy engines, if any, besides intrusion detection policy engines, thus reducing the total processing time for the entire system significantly. The use of such pipelined architecture in the policy agent 120 and the rule trees enable the IDS policy agent 120 to analyze multi-gigabit network traffic per second. Thus, the intrusion detection system of the present invention can operate in in-line mode and enable the ISPs to provide intrusion detection and protect their customers from intrusion at wire speed without adding any processing burden on the host servers.

Figure 4:
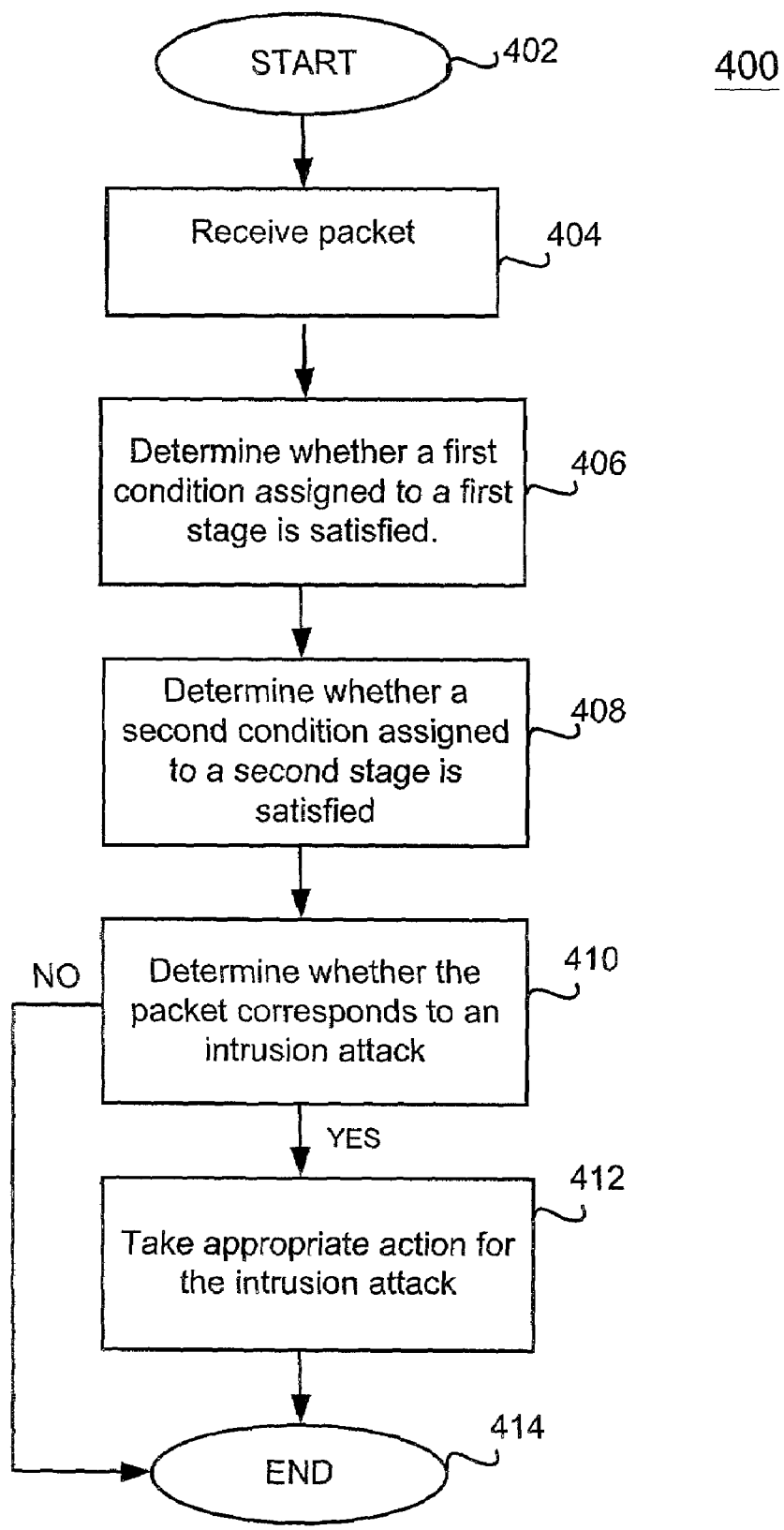
FIG. 4 is a flow chart illustrating the method 400 of detecting an intrusion attack to packets according to one embodiment of the present invention.

FIG. 4 is a flow chart illustrating the method 400 of detecting an intrusion attack to packets according to one embodiment of the present invention. The method 400 is performed by the policy agent 120.

Referring to FIG. 4, as the process is started 402, the policy agent 120 receives 404 the packet. Then, it is determined 406 at a first stage of the intrusion detection system whether a first condition assigned to the first stage is satisfied for the packet. When the first condition is satisfied, an indication is added to the packet representing that the first condition is satisfied. Next, it is determined 408 at a second stage of the intrusion detection system whether a second condition assigned to the second stage is satisfied for the packet. Then, it is determined 410 whether the packet corresponds to an intrusion attack, by determining that the indication is added and that the second condition is satisfied. The packet is determined to correspond to an intrusion attack when the first condition and the second condition are satisfied. When it is determined 410 that the packet corresponds to an intrusion attack, an action corresponding to the intrusion attack is taken 412, and the process ends 414. Examples of such actions are listed in the rule action table explained above, which include sending a warning. If it is determined 410 that the packet does not correspond to an intrusion attack, the process ends 414.

According to the present invention, the IDS PE detects intrusion attacks of IP packets based on pre-configured attack knowledge (rule conditions) at high speed. Though, the concept has been applied to IP packets, it can be extended with minimal modifications to other types of networks and protocols.

The various modules in the pipelined structure of the policy agent 120 can be consolidated to fewer modules or further divided to more modules. Accordingly, the number of modules and the manner in which the conditions in the rule tree 200 are assigned to the modules and the various extensions are generated, as illustrated herein, are merely exemplary and can be modified depending upon the processing needs of the policy agent 120.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems appears in the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. In a multi-stage intrusion detection system, a method of detecting a plurality of intrusion attacks to a packet transmitted on a network, the intrusion attacks associated with a plurality of conditions, the method comprising:
- receiving the packet;
- determining at a first stage of the intrusion detection system whether a first condition assigned to the first stage is satisfied for the packet;
- determining at a second stage of the intrusion detection system whether a second condition assigned to the second stage is satisfied for the packet; and
- determining that the packet corresponds to an intrusion attack when it is determined that the first condition and the second condition are satisfied.

2. The method of claim 1, wherein responsive to determining that the packet corresponds to an intrusion attack, the method further comprises taking an action for the intrusion attack.

3. The method of claim 2, wherein the action comprises warning that the intrusion attack occurred.

4. The method of claim 1, wherein determining at a first stage whether a first condition is satisfied comprises:
- responsive to the first condition being satisfied, adding an indication to the packet representing that the first condition is satisfied.

5. The method of claim 4, wherein determining that the packet corresponds to an intrusion attack comprises determining that the indication is added and that the second condition is satisfied.

6. The method of claim 1, wherein the network is the Internet and the packet is an IP packet.

7. An intrusion detection system for detecting a plurality of intrusion attacks to a packet transmitted on a network, each intrusion attack associated with a plurality of conditions, each condition belonging to one of a first, second, third, fourth and fifth set of conditions, the intrusion detection system comprising:
- a generic extension builder for (i) receiving the packet, (ii) processing the first set of conditions on the packet to generate generic extensions, and (iii) outputting the packet along with the generic extensions added to the packet;
- a session cache module coupled to the generic extension builder for (i) receiving the packet with the generic extension, (ii) processing the second set of conditions on the packet to generate session cache extensions, and (iii) outputting the packet along with the generic extensions and the session cache extensions added to the packet;
- an application decode module coupled to the session cache module for (i) receiving the packet with the generic extensions and the session cache extensions, (ii) processing the third set of conditions on the packet to generate application decode extensions, and (iii) outputting the packet along with the generic extensions, the session cache extensions, and the application decode extensions added to the packet;
- a rule engine module coupled to the application decode module for (i) receiving the packet with the generic extensions, the session cache extensions, and the application decode extensions; (ii) processing the fourth set of conditions on the packet to generate rule engine extensions, and (iii) outputting the packet along with the generic extensions, the session cache extensions, the application decode extensions, and the rule engine extensions added to the packet; and
- an intrusion detection policy engine coupled to the rule engine module for (i) receiving the packet with the generic extensions, the session cache extensions, the application decode extensions, and the rule engine extensions; (ii) processing the fifth set of conditions on the packet, (iii) determining whether all the conditions of an intrusion attack are satisfied based upon the generic extensions, the session cache extensions, the application decode extensions, the rule engine extensions, and the processed fifth set of conditions, (iv) taking an action corresponding to the determined intrusion attack, and (v) outputting the packet.

8. The intrusion detection system of claim 7, further comprising a policy manager controlling the application decode module, the rule engine module, and the intrusion detection policy engine, wherein:
- the application decode module receives application decode data from the policy manager for use in processing the third set of conditions on the packet;
- the rule engine module receives the fourth set of conditions from the policy manager; and
- the intrusion detection policy engine receives the fifth set of conditions from the policy manager.

9. A multi-stage intrusion detection system for detecting a plurality of intrusion attacks to a packet transmitted on a network, each intrusion attack associated with a plurality of conditions, the multi-stage intrusion detection system comprising:
- a plurality of modules each corresponding to selected ones of the conditions and each determining whether the corresponding conditions are satisfied; and
- a policy manager controlling selected ones of the modules and providing information used in determining whether the corresponding conditions are satisfied to the selected ones of the modules,
- wherein an intrusion attack is detected when all the conditions corresponding to the intrusion attack are determined to be satisfied by the respective modules.

10. An intrusion detection system for detecting a plurality of intrusion attacks to a packet transmitted on a communication network, each intrusion attack associated with a rule having a plurality of conditions and an action to be taken when the intrusion attack is detected, the intrusion detection system comprising:
- a rule database storing the rules for each of the intrusion attacks;
- a policy compiler coupled to the rule database and converting the conditions in the rules to a rule tree, the rule tree including a plurality of condition node pairs each having an expression node and a value node, each condition node pair corresponding to one condition and coupled to another condition node pair via at least one branch to form a plurality of paths, such that traversing along one of the paths corresponds to determining the conditions of a rule associated with one of the intrusion attacks; and
- an intrusion detection policy agent coupled to the policy compiler for determining whether an intrusion attack occurred to the packet based upon the rule tree provided by the policy compiler.

11. The intrusion detection system of claim 10, wherein a user provides the rule database with the rules for the intrusion attacks.

12. The intrusion detection system of claim 10, wherein the network is the Internet and the rules for the intrusion attacks are provided to the rule database by a website storing the rules.

13. The intrusion detection system of claim 10, wherein the policy compiler converts the conditions to the rule tree by grouping common conditions among the rules, each condition node pair in the tree corresponding to one of the common conditions or a non-common condition, and coupling a first condition node pair with a second condition node pair among the condition node pairs when both the first and second condition node pairs correspond to a same rule.

14. The intrusion detection system of claim 10, wherein a user selects a number of rules among the rules stored in the rule database and provides the selection of the rules to the policy manager, and the policy manager converts the conditions in only the selected rules to the rule tree.

15. The intrusion detection system of claim 10, wherein the intrusion detection policy agent comprises a plurality of modules each corresponding to selected ones of the condition node pairs and each determining whether the conditions corresponding to the selected ones of the condition node pairs are satisfied, wherein an intrusion attack is detected when all the conditions corresponding to the intrusion attack are determined to be satisfied by the respective modules.

16. The intrusion detection system of claim 15, further comprising a policy manager controlling selected ones of the modules of the intrusion detection policy agent and providing information used for determining whether the conditions are satisfied to the selected ones of the modules.

17. The intrusion detection system of claim 15, wherein the conditions belong to one of a first, second, third, fourth, and fifth set of conditions, and the plurality of modules comprise:
  a generic extension builder for (i) receiving the packet, (ii) processing the first set of conditions on the packet to generate generic extensions, and (iii) outputting the packet along with the generic extensions added to the packet;
  a session cache module coupled to the generic extension builder for (i) receiving the packet with the generic extensions, (ii) processing the second set of conditions on the packet to generate session cache extensions, and (iii) outputting the packet along with the generic extensions and the session cache extensions added to the packet;
  an application decode module coupled to the session cache module for (i) receiving the packet with the generic extensions and the session cache extensions, (ii) processing the third set of conditions on the packet to generate application decode extensions, and (iii) outputting the packet along with the generic extensions, the session cache extensions, and the application decode extensions added to the packet;
  a rule engine module coupled to the application decode module for (i) receiving the packet with the generic extensions, the session cache extensions, and the application decode extensions; (ii) processing the fourth set of conditions on the packet to generate rule engine extensions, and (iii) outputting the packet along with the generic extensions, the session cache extensions, the application decode extensions, and the rule engine extensions added to the packet; and
  an intrusion detection policy engine coupled to the rule engine module for (i) receiving the packet with the generic extensions, the session cache extensions, the application decode extensions, and the rule engine extensions; (ii) processing the fifth set of conditions on the packet, (iii) determining whether all the conditions of an intrusion attack are satisfied based upon the generic extensions, the session cache extensions, the application decode extensions, the rule engine extensions, and the processed fifth set of conditions, (iv) taking an action corresponding to the determined intrusion attack, and (v) outputting the packet.

18. The intrusion detection system of claim 17, wherein the policy manager controls the application decode module, the rule engine module, and the intrusion detection policy engine, and wherein:
  the application decode module receives application decode data from the policy manager for use in processing the fifth set of conditions on the packet;
  the rule engine module receives the fourth set of conditions from the policy manager; and
  the intrusion detection policy engine receives the fifth set of conditions from the policy manager.

19. A computer-readable medium storing a rule tree for use in an intrusion detection system for detecting a plurality of intrusion attacks to a packet transmitted on a network, each intrusion attack associated with a rule having a plurality of conditions and an action to be taken when the intrusion attack is detected, wherein the rule tree comprises a plurality of condition node pairs each having an expression node and a value node, each condition node pair corresponding to one condition and coupled to another condition node pair via a branch to form a plurality of paths, such that traversing along one of the paths corresponds to determining all the conditions of the rule associated with one of the intrusion attacks.

20. The computer-readable medium of claim 19, wherein:
  the rules include common conditions corresponding to more than one rule;
  at least one of the condition node pairs in the tree corresponds to one of the common conditions; and
  the condition node pairs are coupled to one another via branches when the coupled condition node pairs correspond to a same rule.

21. A multi-stage intrusion detection system for detecting a plurality of intrusion attacks to a packet transmitted on a network, the intrusion attacks associated with a plurality of conditions, the multi-stage intrusion detection system comprising:
  a first stage receiving the packet and determining whether a first condition assigned to the first stage is satisfied for the packet; and
  a second stage determining whether a second condition assigned to the second stage is satisfied for the packet, wherein the multi-stage intrusion detection system determines that the packet corresponds to an intrusion attack when it is determined that the first condition and the second condition are satisfied.

22. The multi-stage intrusion detection system of claim 21, wherein responsive to determining that the packet corresponds to an intrusion attack, the multi-stage intrusion detection system takes an action for the intrusion attack.

23. The multi-stage intrusion detection system of claim 22, wherein the action comprises warning that the intrusion attack occurred.

24. The multi-stage intrusion detection system of claim 21, wherein responsive to the first condition being satisfied, the first stage adds an indication to the packet representing that the first condition is satisfied.

25. The multi-stage intrusion detection system of claim 24, wherein the second stage determines that the packet corresponds to an intrusion attack by determining that the indication is added and that the second condition is satisfied.

26. The multi-stage intrusion detection system of claim 21, wherein the network is the Internet and the packet is an IP packet.

* * * * *